United States Patent [19]

Crosby et al.

[11] Patent Number: 5,052,858
[45] Date of Patent: Oct. 1, 1991

[54] APPARATUS AND METHOD FOR THERMALLY STRIPPING VOLATILE ORGANIC COMPOUNDS FROM SOIL

[76] Inventors: Richard A. Crosby, 7257-203 Point Lake Dr., Charlotte, N.C. 28212; Junior L. Crosby, 7819-105 Calibre Crossing, Charlotte, N.C. 28227

[21] Appl. No.: 537,089

[22] Filed: Jun. 12, 1990

[51] Int. Cl.⁵ .................... F23G 7/14; F23G 5/04; F23G 5/12; F23G 5/20
[52] U.S. Cl. .................... 405/128; 110/346; 210/771; 432/108; 432/111; 432/118
[58] Field of Search ............... 405/128, 129; 241/DIG. 10; 110/235, 236, 240, 241, 346; 210/771; 34/136, 137; 432/105, 108, 110, 111, 118; 209/284, 297

[56] References Cited

U.S. PATENT DOCUMENTS

| | | | |
|---|---|---|---|
| 3,745,700 | 7/1973 | Hahn | 47/1.42 |
| 3,861,335 | 1/1975 | Przewalski | 110/14 |
| 4,648,332 | 3/1987 | Goedhart | 110/346 |
| 4,648,333 | 3/1987 | Mudd et al. | 110/346 |
| 4,667,609 | 5/1987 | Hardison et al. | 110/236 |
| 4,700,638 | 10/1987 | Przewalski | 110/346 |
| 4,715,965 | 12/1987 | Sigerson et al. | 110/346 X |
| 4,730,564 | 3/1988 | Abboud | 110/246 |
| 4,748,921 | 6/1988 | Mendenhall | 110/346 |
| 4,815,398 | 3/1989 | Keating et al. | 110/233 |
| 4,864,942 | 9/1989 | Fochtman et al. | 110/226 |
| 4,881,475 | 11/1989 | De Leur | 110/346 |
| 4,951,417 | 8/1990 | Gerken et al. | 47/1.42 |
| 4,957,429 | 9/1990 | Mendenhall | 110/236 X |

OTHER PUBLICATIONS

R. Perry and D. Green, Perry's Chemical Engineers' Handbook, at 20-29 to 20-46 (6th ed. 1984).

*Primary Examiner*—Dennis L. Taylor
*Assistant Examiner*—John Ricci
*Attorney, Agent, or Firm*—Woodcock Washburn Kurtz Mackiewicz & Norris

[57] ABSTRACT

An apparatus and method are provided for removing volatile organic compounds from soil in order to comply with environmental regulations. The apparatus is comprised of a rotating drum in which the contaminated soil is loaded. The drum contains an auger mechanism which aerates the soil. An air heater generates hot air which is directed to the drum and circulates therethrough, causing rapid volatilization of the volatile organic compounds. The volatile organic compounds are then expelled to atmosphere. The removal of volatile organic compounds is conducted in a batch fashion, loading and unloading the drum following each processing cycle. The apparatus is mobile and may be transported to any clean up site.

36 Claims, 4 Drawing Sheets

APPARATUS AND METHOD FOR THERMALLY STRIPPING VOLATILE ORGANIC COMPOUNDS FROM SOIL

BACKGROUND OF THE INVENTION

The present invention is directed to an apparatus and method for removing volatile organic compounds, such as petroleum hydrocarbons, from soil, as a means for the environmental clean up of a dump site, landfill or spill site.

Environmental laws have imposed requirements that remedial measures be taken in dump sites, landfills and following chemical spills, leakages or other accidents. This is particularly important in order to prevent chemicals from contaminating ground water due to percolation through the soil. When the chemical contaminant is a volatile organic compound, the remedial measures may involve removing such compounds from the soil by volatilization. Such volatilization can readily be accomplished by heating the soil in a furnace. However, this method requires that the soil be transported to a suitable processing facility for treatment. For all but very small clean ups, this method is prohibitively expensive in view of the high transportation costs required.

Consequently, it would be desirable to develop an apparatus and method for removing volatile organic compounds from contaminated soil while on-site, using as a means for such removal, equipment that is easily transported to that site. Since, with portable equipment, the volume of soil which can be processed at any one time will necessarily be limited, it would be desirable to provide a means for accelerating the volatilization rate so that the total clean up time is minimized.

The present invention is directed to these important ends.

SUMMARY OF THE INVENTION

The object of the present invention is to provide an apparatus and method for removing volatile organic compounds from soil in a dump site or landfill, or in areas following a spill or leakage of such compounds. It is a further object of the invention that the apparatus be transportable to the clean up site and capable of removing the volatile organic compounds in a relatively short period of time. These and other objects are accomplished by the present invention.

Specifically, the present invention employs the rotating drum of a cement truck to hold soil during processing. An auger in the drum mechanically aerates the soil as a result of the drum rotation. An air heater generates hot air which is directed to the drum through a duct. The hot air circulates through the drum and comes into intimate contact with the soil as a result of the aforementioned mechanical aeration. The combined effects of the aeration and heating result in a rapid volatilization of the volatile organic compounds, said volatilized compounds then being expelled to the atmosphere or subjected to further treatment.

In accordance with the present apparatus and method, a fan forces ambient air through the air heater, and an in-stream burner heats the air to approximately 800°-1500° F., more preferably 1000°-1050° F. A control module regulates the fuel flow to the burner so as to maintain the air temperature directed to the drum at the desired level. A fuel tank is also provided, and supplies the burner with fuel flow.

All of the aforementioned equipment is mobile, the drum being supported on the bed of the cement truck and the air heater and fuel tank each mounted on separate skids.

DESCRIPTION OF THE PREFERRED EMBODIMENT

Figure 1:
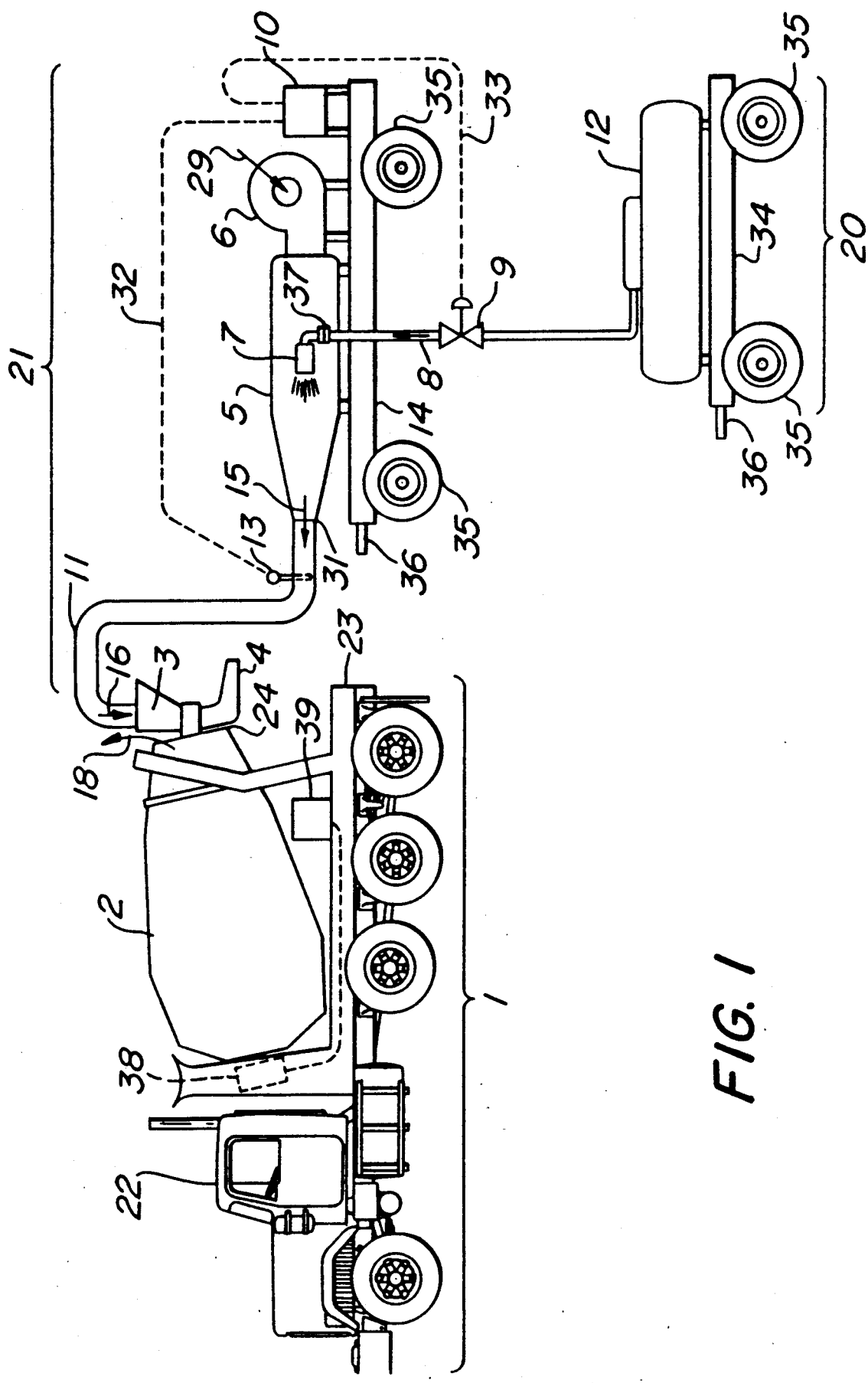
FIG. 1 is a schematic representation of the thermal stripper system.

There is shown in FIG. 1 a schematic representation of a portable thermal stripping system. The primary components of the system are a cement truck (1), an air heater (21), and a fuel supply (20). The cement truck is comprised of a tractor (22), connected to a truck bed (23) on which is supported a drum (2). The drum is capable of rotation about its longitudinal axis in both the clockwise and counter clockwise directions at varying speeds through the action of a hydraulic drive mechanism (38) which is disposed in the truck bed and powered by the truck engine. In the preferred embodiment, the drive mechanism (38) is capable of rotating the drum at speeds up to 50 RPM. The drum rotational speed may be controlled by varying the engine RPM by adjustment of the throttle setting. At any given throttle setting, the drum rotational speed may also be adjusted by operating a valve in the hydraulic drive system. The initiation and direction of drum rotation is controlled through panel (39), which features start, stop and forward/reverse rotation switches. The drive system described above is of the standard type used in cement trucks.

The drum is an approximately cylindrically shaped vessel. In the preferred embodiment, the drum is of the standard cement truck type, such as Model Rex 770, which may be purchased from Rex Works, Inc., Milwaukee, Wis. 53201. Preferably, the drum has an axial length of approximately 15 ft., a maximum diameter of approximately 8 ft., and a useful capacity in the range of 8-10 cubic yards of soil, such dimensions making the drum suitable for ready transportation using conventional cement truck tractors. However, the principles disclosed herein are equally applicable to larger or smaller drums. The drum features an opening (24) in its aft end, to which is attached an inlet hopper (3) and a discharge chute (4). As explained further below, soil to be processed enters and exits the drum through the inlet hopper and discharge chute, respectively.

As shown in FIG. 1, in the preferred embodiment, the axis of the drum is inclined with respect to the horizontal at an angle in the range of about 10-15 degrees. Note that the aft end, in which the opening (24) is disposed, is higher than the front end.

An auger mechanism is disposed within the drum. The auger mechanism performs two important functions—grinding/churning of the soil and transporting of the soil into and out of the drum. Since volatilization occurs through the surface of the soil particles, removal of contaminants from large clumps of soil would require prohibitively long processing times. The grinding action of the auger mechanism minimizes particle size, thereby increasing the surface area of the soil. Thus, pretreatment of the soil, even heavy clay-like soil, is not required. The churning action of the auger mechanism constantly exposes the surfaces of the particles to fresh quantities of hot air, supplied to the drum as explained below, thereby mechanically aerating the soil. Thus, the auger mechanism minimizes the time required for adequate volatilization.

Figure 3:
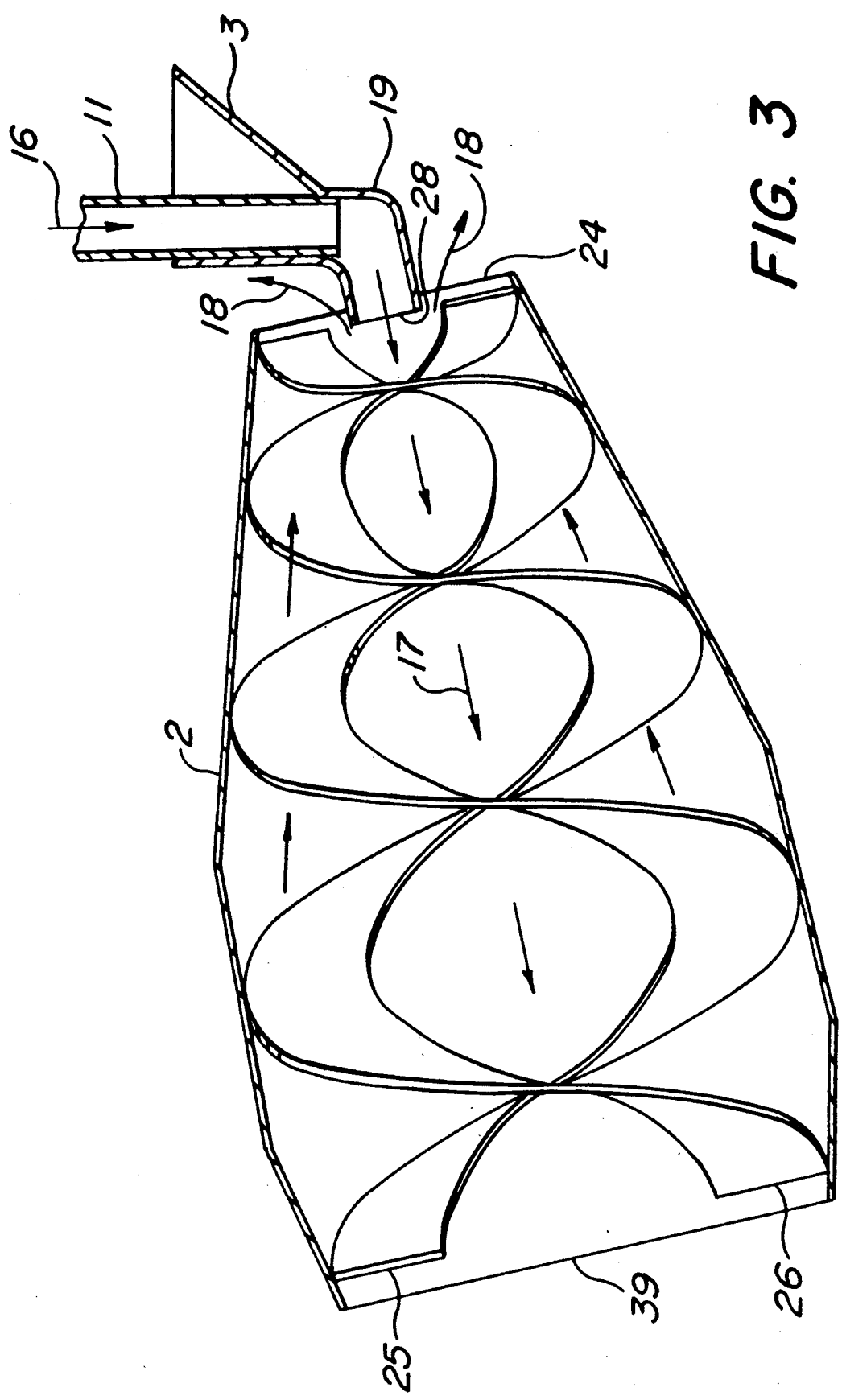
FIG. 3 is a cross section of the drum taken through line III—III shown in FIG. 2, illustrating the auger mechanism.

As shown in FIG. 3, in the preferred embodiment, the auger mechanism is comprised of two continuous helical baffles (25), (26) which extend the length of the drum and terminate at the opening (24). Each helix is affixed at its periphery to the inner surface of the drum, for example, by welding, and projects radially inward into the drum. The axis of each helix is coincident with the longitudinal axis of the drum. Both helixes are of similar configuration—that is, both are right hand or both are left hand helixes. As shown in FIG. 3, the helixes are axially offset from each other by one-half pitch. The radial height of each helical baffle varies as the drum diameter varies along the length of the drum. For a drum with a maximum diameter of approximately 8 feet, the maximum radial height of the helical baffles is approximately 12-18 inches in the preferred embodiment.

Although flat baffles are shown in FIG. 3, more complex shapes, such as baffles whose inboard edges are bent at 45° or 90° to the body of the baffle, may be used to increase the churning capacity of the auger mechanism. Moreover, although two baffles are used in the preferred embodiment, as will be obvious to those skilled in the art, the auger mechanism may be comprised of a single helical baffle or three or more helical baffles similarly affixed to the drum.

The grinding/churning actions of the auger mechanism are achieved by rotating the drum, which in turn results in rotation of the auger about its axis using the aforementioned hydraulic drive mechanism. This arrangement is standard for cement trucks. Alternatively, the auger mechanism could be comprised of one or more helical baffles affixed at their inner edge to a shaft, the center line of the shaft being coincident with the longitudinal axis of the drum. In this embodiment, the drum would remain stationary and the grinding/churning action of the auger mechanism would be achieved by rotating the shaft within the drum.

As previously discussed, the auger mechanism serves to transport, as well as grind and churn the soil. Thus, rotation of the drum in one direction serves to carry the soil up the incline from the bottom of the drum and pushes it out onto the discharge chute. In this respect, the auger mechanism functions as a screw-type conveyor. Rotation of the drum in the opposite direction results in the aforementioned grinding and churning action. The direction of rotation, clockwise or counter clockwise, which causes the transporting and grinding/churning actions, respectively, depends on whether the auger helix is right or left handed, and may be arbitrarily chosen. As will be apparent to those skilled in the field of screw-type conveyors, the minimum pitch sufficient to efficiently carry soil out of the drum is related to the incline angle of the drum—that is, the greater the incline, the smaller the helical pitch required.

Figure 4:
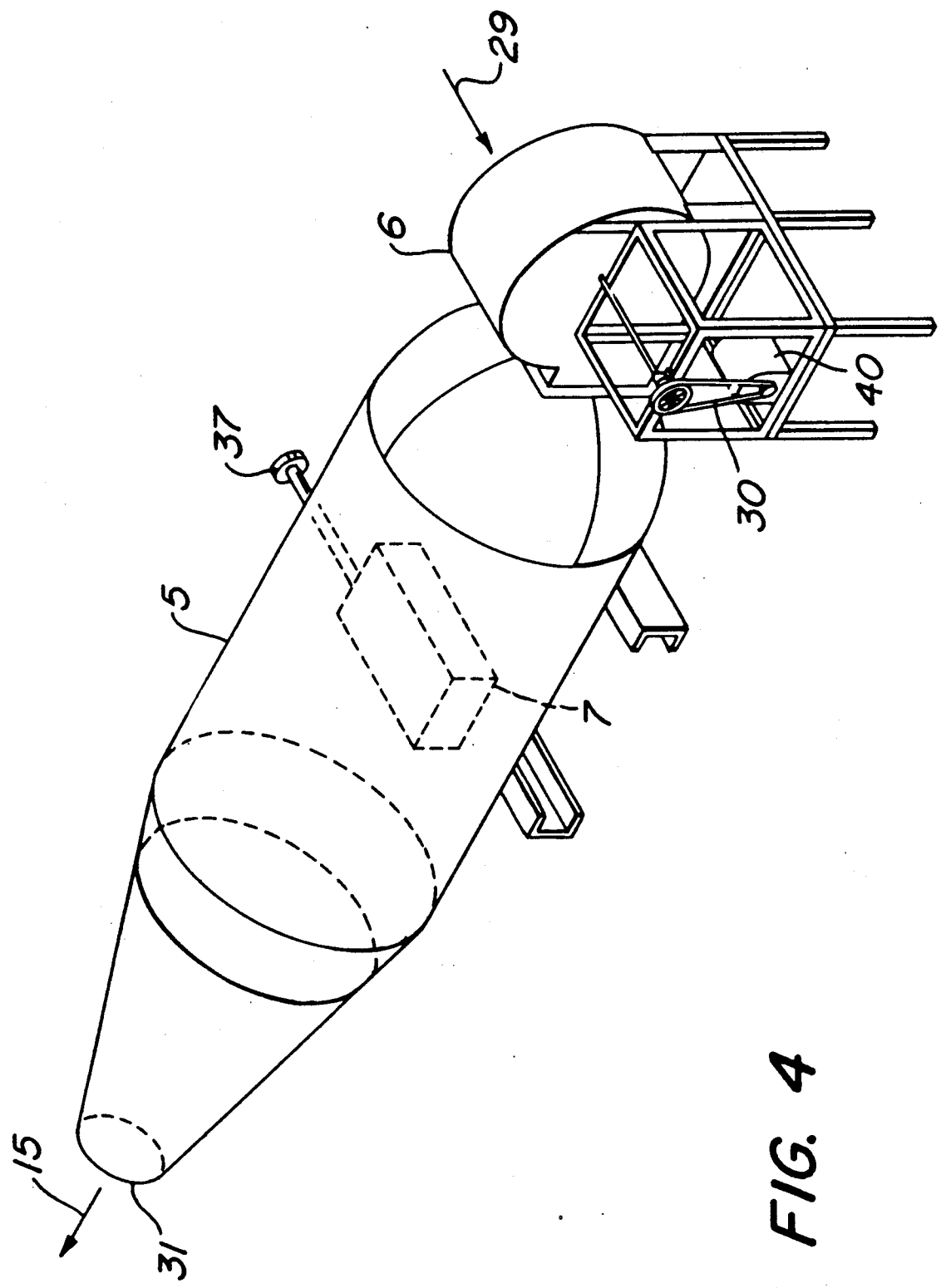
FIG. 4 is a perspective view of the air heater.

Returning to FIG. 1, it can be seen that the air heater (21) is comprised of a cylindrical vessel (5), a fan (6), a duct (11), a skid (14), a burner (7) and a control module (10). The burner (7), which is of the in-stream type (meaning the air to be heated flows over the burner), is disposed within the vessel (5) as shown in FIG. 4, and burns a liquid or gaseous fuel. The burner is supplied with fuel from the fuel tank (12), which is mounted on skid (34). Piping (8) connects the fuel tank to the burner and features a detachable coupling (37) at the piping-/burner interface. In the preferred embodiment, the burner operates on propane fuel and has a maximum heat release capacity of 2.5 mbtu/hr.

As shown in FIG. 4, a fan (6) is connected to the aft end of the vessel (5). Ambient air (29) is drawn into the vessel by the fan and forced to flow over the burner (7), providing it with the necessary combustion air. In the preferred embodiment, the fan is of the centrifugal type and features backward inclined blades and has a maximum capacity of 4000 SCFM. Other types of fans, including axial fans, could also be used, provided they can deliver the flow of air required for good volatilization, which in turn depends on the size selected for the drum. In the preferred embodiment, the fan features an indirect drive through belt (30) from motor (40). The output of the fan is set by varying the speed of the fan by loosening or tightening the belt (30). Alternatively, the output of the fan could be varied by the use of variable inlet guide vanes, variable inlet or outlet dampers, or a variable speed motor.

After being heated by the burner (7), the air (15) is discharged from the vessel (5) through a nozzle (31) at the front end of the vessel. Note that the walls of the vessel approaching the nozzle are gradually tapered to insure smooth flow and minimize the backpressure in the system. After exiting the nozzle, the hot air (15) flows through the duct (11), as shown in FIG. 1. A thermocouple (13) is disposed at the inlet to the duct and senses the temperature of the hot air. Since the vapor pressure of volatile organic compounds increases with increasing temperature, the hotter the air temperature, the more rapid the volatilization rate. However, the temperature should not be so high as to cause incineration of the soil. Therefore, in the preferred embodiment, the temperature of the hot air (15) discharging from the vessel is maintained in the 800°-1500° F. range, depending on the type of contaminant. Moreover, as a result of the intervening duct (11), the flames generated by the burner do not penetrate into the drum, further ensuring volatilization without incineration.

The temperature of the hot air is maintained in the desired range by the control module (10), which may be a micro-computer. The desired air temperature is manually entered into the control module. In addition, the output signal from the thermocouple (13) is transmitted to the control module through the conductor (32). Using means well known to those skilled in the art of flow control systems, the control module compares the measured temperature to the desired temperature and transmits an output signal to flow control valve (9), through conductor (33), the amplitude of which is proportional to the deviation in the measured temperature from the desired temperature. Valve (9) is disposed in the piping (8) between the fuel tank (12) and the burner (7), and regulates the fuel flow to the burner in response to the amplitude of the signal it receives. Thus, the fuel flow to the burner (7), and hence the temperature of the discharging air (15), is increased or decreased by operation of the control module on the flow control valve, as required to maintain the correct temperature. In addition to the flow control valve, other piping, valves and control features are necessary to reliably start and operate the burner and to ensure compliance with local safety regulations. However, such requirements are well known to those skilled in the art of burner systems and are not described in detail herein. In addition to regulating fuel flow, the control module performs the sequencing functions necessary to start and operate the fan and burner.

As shown in FIG. 1, the duct (11) terminates at the inlet hopper (3) of the drum. As shown in FIG. 3, the outside diameter of the duct (11) is only slightly smaller than the inside diameter of the hopper throat (19). Thus, no connection is required to mate the duct to the drum other than inserting the duct into the hopper throat.

The hopper is aligned so that its discharge (28) is concentric with the drum opening (24), thereby directing the incoming hot air (16) into the drum along its axis. The hot air (17) circulates within the drum and, as a result of the churning action of the auger mechanism, comes into direct contact with the soil particles. Thus, the combined effect of the auger mechanism and the air heater results in vigorous mechanical aeration and heating of the soil. This aeration and heating promotes rapid volatilization of the volatile organic compounds.

Figure 2:
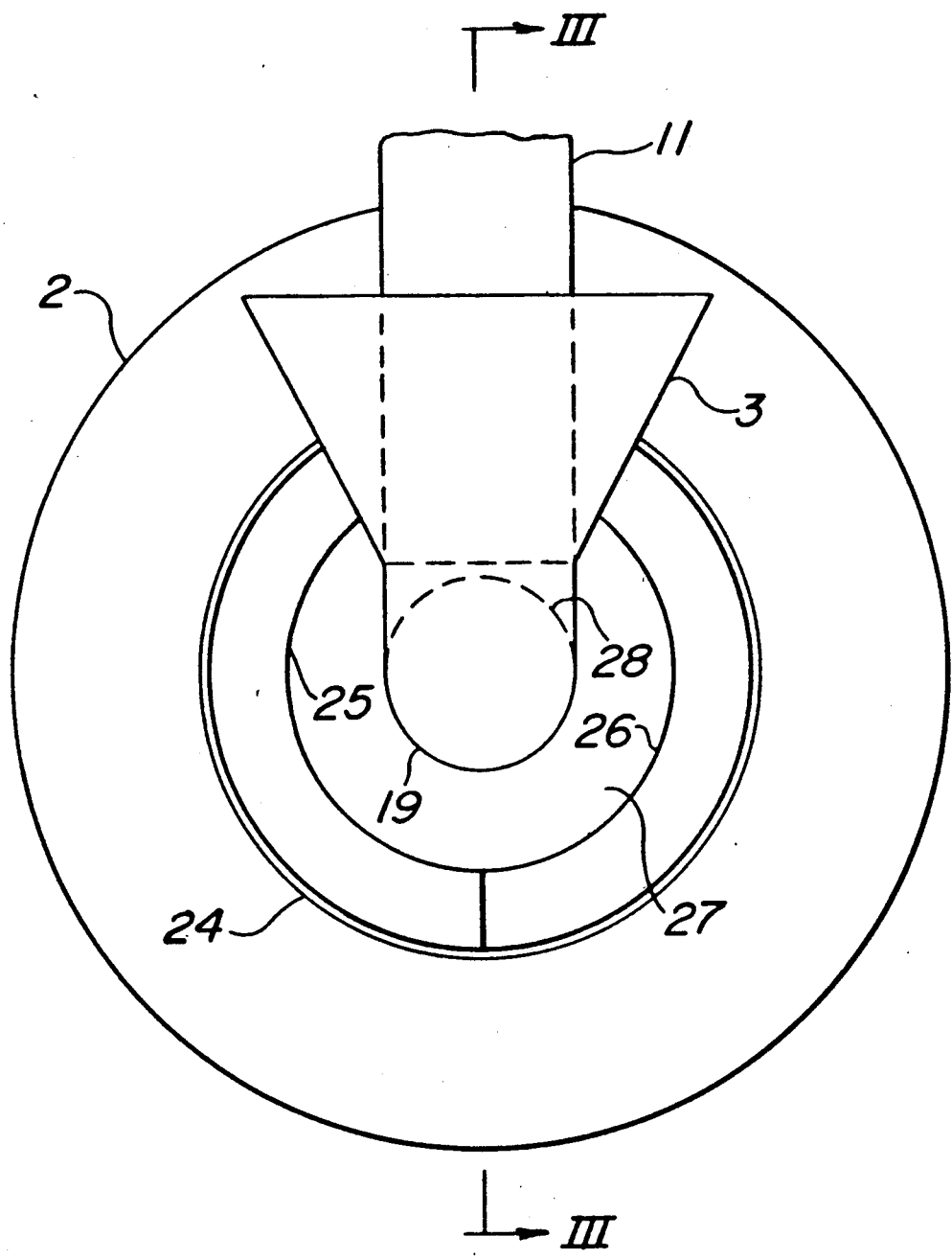
FIG. 2 shows the rear end of the drum, without the discharge chute installed.

As explained above, the hopper discharge (28) is centrally disposed in the drum opening. The annular portion (27) of the drum opening (24) which surrounds the hopper discharge, shown best in FIG. 2, serves as the exhaust port for the drum. After circulating through the drum, the hot air (18) preferably exhausts directly into the atmosphere through this annular portion (27). The exhaust air (18) carries with it the vapors released as a result of the volatilization. Since the volatilization rate of the volatile organic compounds decreases with increasing pressure, the flow area of the annular portion (27) should be sized to prevent excessive build up of pressure in the drum. In the preferred embodiment, the diameter of the hopper discharge (28) is only about one third that of the drum opening (24) to ensure ample exhaust flow area.

As a result of the hot air being introduced at the center of the drum opening and the exhaust port being the annular portion; surrounding this center portion, the hot air flows in the circulating flow path shown in FIG. 3. Entering air flows along the core of the drum, reverses direction at the end wall (39) of the drum and then flows out of the drum along the annulus surrounding the drum core. Not only does this flow path provide ample opportunity for contact between the soil particles being churned by the auger mechanism, it also reduces the tendency for "dusting"—that is, there is less of a tendency for fine soil particles to be entrained in air (18) exhausting from the drum if a circulating, as opposed to a straight through, air flow path is utilized. In addition, the helical baffles (25), (26) act as separators, further preventing fine soil particles from being carried out of the drum.

According to the preferred embodiment of the invention, no post-processing clean up of the air exhausting from the drum is employed. Thus, the reduction in dusting afforded by the drum design is an important factor in obtaining the simplicity of the thermal stripping system. It should be noted that the permissibility of directly discharging volatile organic compounds into the atmosphere may be prescribed by federal and local environmental regulations, depending on the type of contaminant in the soil. However, discharge of many volatile organic compounds, such as those associated with gasoline spills, is often permitted subject to certain limitations—usually a maximum rate, expressed as pounds per day of contaminant. Thus, by confining the use of the thermal stripper system to volatile organic compounds which can be safely exhausted directly into the atmosphere in limited quantities, and minimizing the tendency for soil particles to be entrained in the exhaust air, the cost and complexity of an exhaust gas clean up system can be avoided.

An important feature of the thermal stripping system is its ready transportability to the clean up site. The aeration device in the form of a cement truck (1) is easily relocated. Wheels (35) and hitches (36) are attached to the air heater skid (14) and the fuel supply skid (34), making these components entirely portable also. Moreover, upon arrival at the clean up site, one need only to connect the fuel tank to the burner piping at coupling (37), and the insert the hot air duct (11) into the hopper (3), to place the system into operation.

Once at the clean up site, to carry out the method of the invention, the soil to be treated is loaded into the drum through the inlet hopper (3) using standard excavation equipment, such as a front loader. The drum is rotated during the loading process so that the auger mechanism draws the soil from the hopper into the drum. This drum rotation is maintained during the entire soil processing period. To ensure that adequate room exists for the circulation of the hot air, the drum is only partly filled with soil.

After the soil is loaded into the drum, the air heater (21) is moved into position adjacent the drum and the duct (11) is connected to the hopper. The fuel skid (34) is also moved into position and the piping (8) is connected to the burner (7). The fan (6) is then started, followed by the burner (7). As previously mentioned, the control module (10) sequences the start up of the fan and burner and regulates the fuel flow control valve (9) so as to maintain the hot air (15) discharging from the air heater at the appropriate temperature. The air temperature is preselected based on a pre-treatment soil analysis, as discussed below. The hot air then circulates through the rotating drum as previously discussed. As a result of the drum rotation, the auger mechanism grinds and churns the soil, resulting in vigorous aeration of the soil with the hot air. This heating and aeration volatilizes the volatile organic compounds present in the soil. The volatilized organics are then preferably expelled into the atmosphere.

During soil processing, the drum rotational speed must be maintained at the appropriate level for efficient grinding/churning action. A rotational speed which is too slow will result in most of the soil lying stagnate in the lower portion of the drum. A rotational speed which is too high will result in a centrifuge action, causing the soil to cling to the periphery of the drum. The appropriate speed for maximum grinding/churning efficiency will depend on the geometry of the auger mechanism, the diameter of the drum and the density and cohesiveness of the soil. In the preferred embodiment, the rotational speed of the drum is maintained within a range of about 4–18 RPM.

The processing described above is continued until the concentration of the volatile organic compounds in the soil is reduced to, an acceptable level. As those skilled in the art will recognize, the acceptable level depends on the type of organic contaminant, and may also vary with local environmental regulations, but is generally in the range of 10 PPM by weight for the volatile organic compounds associated with gasoline spills.

The length of the processing time required to reduce the concentration of volatile organic compounds to an acceptable level will depend on a variety of design, operating, and soil parameters, as will be readily apparent to those skilled in the art. As previously discussed, the design parameters include the drum size, the geometry of the auger mechanism and the drum incline angle. The operating parameters include the drum rotational speed, the percent of the drum volume filled with soil, the air flow rate, the temperature of the air entering the drum and the air pressure within the drum. Soil parameters include the particle size distribution, cohesiveness, density, moisture content and temperature of the soil, as well as the contaminant type (specifically, the vapor pressure of the volatile organic compound) and its concentration level.

For components of a given design, the operating parameters and the required processing time period are initially determined based on a preliminary soil analysis. The required processing time is directly proportional to the soil particle size, cohesiveness, density, moisture content and contaminant concentration level and indirectly proportional to the soil temperature and the vapor pressure of the volatile organic compound. Since the soil is treated in a batch-like fashion, there is no limitation on the processing time. Moreover, the processing time can be set independent of the drum rotational speed. As those skilled in the art will recognize, clay-like soils will require longer processing time, whereas sandy soil will require shorter processing time. In general, it has been found that a processing time between about 30–90 minutes is adequate for the clean up of most soils contaminated with petroleum products. In one experiment conducted by the inventors, 1900 cubic yards of clay-like soil containing petroleum product contaminants were processed over a 21 day period. Initial concentrations of petroleum hydrocarbons as high as 7000 PPM by weight were reduced in this experiment to less than about 10 PPM by weight by processing for about 60 minutes at a drum rotation of 4 RPM and an airflow of 4000 CFM at 1000° F.

Although the preliminary soil analysis provides initial operating parameters and processing time estimates, samples of processed soil should also be periodically analyzed to insure that the operating parameters and processing time are adequate for the particular conditions of the clean up site. In the preferred embodiment, the soil is analyzed after each 50 cubic yards of soil has been processed.

After the required processing time has elapsed, the burner and fan are shut down and the duct is disconnected from the drum. The drum is then transported to the soil storage area and its rotation is reversed, so that the auger mechanism conveys the processed soil out of the drum and into discharge chute (4). The drum is then reloaded with fresh soil and the process repeated in a batch-like fashion until all of the contaminated soil has been cleaned.

Although the above description has been directed to a preferred embodiment of the invention, it is understood that other modifications and variations known to those skilled in the art may be made without departing from the spirit and scope of the invention, as set forth in the appended claims.

What is claimed is:

1. An apparatus for removing volatile organic compounds from soil comprising:
   (a) an air heater for heating ambient air,
   (b) a drum for holding a predetermined quantity of said soil, said drum having an opening, said opening forming both an inlet airflow path for directing said ambient air heated by said air heater into said drum and a discharge airflow path for directing said ambient air from said drum, said opening being divided into first and second portions, said first portion of said opening forming said inlet airflow path into said drum, said second portion of said opening forming said discharge airflow path from said drum, and
   (c) means for mechanically aerating said soil, said aerating means disposed in said drum.

2. The apparatus according to claim 1 wherein said opening in said drum is the only opening in said drum.

3. The apparatus according to claim 1 wherein said drum is inclined at an angle to the horizontal, said drum having first and second ends, said first end being higher than said second end.

4. The apparatus according to claim 3 wherein said angle is in the range of 10–15 degrees.

5. The apparatus according to claim 3 wherein said opening is formed in said first end and wherein said opening forms both an inlet and outlet for said soil.

6. The apparatus according to claim 1 wherein said means for mechanically aerating said soil comprises a first helical baffle projecting radially inward from the inner surface of said drum, the axis of said first helical baffle being concentric with the longitudinal axis of said drum.

7. The apparatus according to claim 6 wherein said means for mechanically aerating said soil further comprises a second helical baffle projecting radially inward from the inner surface of said drum, the axis of said second helical baffle being concentric with the longitudinal axis of said drum.

8. The apparatus according to claim 6 further comprising means for rotating said drum about its longitudinal axis in both the clockwise and counter-clockwise directions.

9. The apparatus according to claim 1 further comprising means for transporting said drum and said air heater.

10. The apparatus according to claim 9 wherein said transporting means comprises a truck bed on which said drum is disposed and a skid on which said air heater is disposed.

11. The apparatus according to claim 1 wherein said inlet airflow path and said outlet airflow path formed by said opening form a portion of a recirculating airflow path through said drum.

12. The apparatus according to claim 11 wherein said opening is approximately circular, said first portion of said opening being the center portion of said opening, said first portion of said opening being approximately one third the diameter of said opening.

13. An apparatus for removing volatile organic compounds from soil comprising:
   (a) a drum for holding a predetermined quantity of said soil,
   (b) an auger mechanism disposed in said drum, said auger mechanism having means for grinding and churning said soil when said auger mechanism is rotated in a first direction and means for transporting said soil out of said drum when said auger mechanism is rotated in a second direction, and
   (c) an air heater, said air heater in airflow communication with said drum.

14. The apparatus according to claim 13 wherein said drum has first and second ends, an opening being formed in said first end into which said soil is loaded and from which said soil is discharged.

15. The apparatus according to claim 14 further comprising means for rotating said drum about its longitudinal axis.

16. The apparatus according to claim 15 wherein said rotating means is capable of rotating said drum in both the clockwise and counter clockwise directions.

17. The apparatus according to claim 14 wherein said auger mechanism comprises a first helical baffle, said first baffle affixed at its periphery to the inner surface of said drum and terminating at said opening.

18. The apparatus according to claim 17 wherein said auger mechanism further comprises a second helical baffle, said second baffle affixed at its periphery to the inner surface of said drum and terminating at said opening.

19. The apparatus according to claim 14 wherein said drum is inclined at an angle to the horizontal, said first end being higher than said second end.

20. The apparatus according to claim 19 wherein said angle is in the range of 10–15 degrees.

21. The apparatus according to claim 14 wherein said air heater comprises:
    (a) a vessel,
    (b) means for generating an airflow, said airflow generating means in airflow communication with said vessel, and
    (c) means for heating said airflow, said heating means disposed in said vessel.

22. The apparatus according to claim 21 wherein said airflow generating means and said heating means comprises a fan and a burner, respectively.

23. The apparatus according to claim 22 wherein said air heater further comprises a duct connecting said vessel to said drum, said air flow generated by said fan flowing through said duct after said air flow is heated by said burner.

24. The apparatus according to claim 23 wherein:
    (a) said vessel has first and second ends, openings being formed in both said first and second ends,
    (b) said duct has first and second ends, said first end of said duct being connected to said opening formed in said first end of said drum, said second of said duct being connected to said first end of said vessel, and
    (c) said fan is connected to said second end of said vessel.

25. The apparatus according to claim 22 further comprising a fuel supply, said fuel supply in fuel flow communication with said burner.

26. The apparatus according to claim 25 further comprising means for transporting said drum, said air heater and said fuel supply.

27. The apparatus according to claim 26 wherein said transporting means comprises:
    (a) a truck bed on which said drum is supported,
    (b) a first skid on which said air heater is disposed, and
    (c) a second skid on which said fuel supply is disposed.

28. A method for removing volatile organic compounds from soil comprising the steps of:
    (a) loading said soil into an opening in a drum,
    (b) transporting said soil into said drum by rotating said drum in a first direction,
    (c) mechanically aerating said soil in said drum,
    (d) causing hot air to flow through said aerating soil, thereby volatilizing said volatile organic compounds into said hot air,
    (e) exhausting said hot air out of said drum after said hot air has flowed through said drum, and
    (f) discharging said soil from said drum through said opening by rotating said drum in a second direction.

29. The method according to claim 28 wherein the step of mechanically aerating said soil comprises the steps of grinding and churning said soil by action of an auger.

30. The method according to claim 29 wherein said auger action is achieved by the step of rotating said drum in said first direction.

31. The method according to claim 30 wherein said drum is rotated in said first direction at a speed in the range of about 4–18 RPM.

32. The method according to claim 28 wherein said hot air is heated to a temperature below the incineration temperature of said soil.

33. The method according to claim 28 wherein said hot air is heated to a temperature of between about 800°–1500° F.

34. The method according to claim 28 further comprising the step of heating said air by flowing ambient air through a vessel while burning a fuel in said vessel.

35. The method according to claim 28 wherein the step of causing hot air to flow through said aerating soil comprises the steps of:
    (a) introducing said hot air into a first portion of said opening in said drum, and
    (b) causing said hot air to circulate through said drum, whereby said hot air flows into said drum in a first direction and out of said drum in a second direction.

36. The method according to claim 35 wherein the step of exhausting said hot air comprises the step of causing said hot air to flow to atmosphere.

* * * * *